United States Patent
Reddy et al.

(10) Patent No.: US 7,686,084 B2
(45) Date of Patent: Mar. 30, 2010

(54) WELL BORE SERVICING FLUIDS COMPRISING THERMALLY ACTIVATED VISCOSIFICATION COMPOUNDS AND METHODS OF USING THE SAME

(75) Inventors: B. Raghava Reddy, Duncan, OK (US); Frank Zamora, Duncan, OK (US); Ronney R. Koch, Duncan, OK (US); Joe M. Sandy, Duncan, OK (US); Ian D. Robb, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 24 days.

(21) Appl. No.: 12/021,889

(22) Filed: Jan. 29, 2008

(65) Prior Publication Data

US 2008/0121395 A1 May 29, 2008

Related U.S. Application Data

(62) Division of application No. 10/780,314, filed on Feb. 17, 2004, now Pat. No. 7,351,681.

(51) Int. Cl.
*E21B 43/16* (2006.01)
*E21B 43/26* (2006.01)

(52) U.S. Cl. .................. 166/300; 166/305.1; 166/308.1

(58) Field of Classification Search ................... None
See application file for complete search history.

(56) References Cited

U.S. PATENT DOCUMENTS

| 2,281,810 | A |   | 5/1942 | Stone et al. |   |
|---|---|---|---|---|---|
| 3,202,214 | A |   | 8/1965 | McLaughlin, Jr. |   |
| 3,241,612 | A |   | 3/1966 | Hiller |   |
| 3,375,872 | A |   | 4/1968 | McLaughlin et al. |   |
| 3,902,557 | A | * | 9/1975 | Shaughnessy et al. | ....... 166/295 |
| 4,210,214 | A |   | 7/1980 | Blanton |   |
| 4,293,440 | A |   | 10/1981 | Elphingstone et al. |   |
| 4,506,734 | A | * | 3/1985 | Nolte | ....................... 166/308.1 |
| 4,552,215 | A |   | 11/1985 | Almond et al. |   |
| 4,553,601 | A |   | 11/1985 | Almond et al. |   |

(Continued)

FOREIGN PATENT DOCUMENTS

EP        1178099 A2      2/2002

(Continued)

OTHER PUBLICATIONS

Carlsson, A., et al., "Interaction between ethyl (hydroxyethyl) cellulose and sodium dodecyl sulphate in aqueous solution," Colloid polym Sci, 1988, vol. 266, No. 11, pp. 1031-1036.

(Continued)

*Primary Examiner*—Zakiya W Bates
*Assistant Examiner*—Angela M DiTrani
(74) *Attorney, Agent, or Firm*—Craig W. Roddy; Conley Rose, P.C.

(57) ABSTRACT

Well bore servicing fluids are provided that include a thermally activated viscosification compound. Further, methods of servicing a well bore are provided that include displacing such a servicing fluid into the well bore, wherein a viscosity of the servicing fluid increases as it passes down the well bore due to its temperature increasing. Thus, the viscosity of the servicing fluid is effective to suspend solids therein when the servicing fluid is in the well bore. The servicing fluid may be, for example, a cement slurry, a drilling fluid, a gravel packing fluid, a fracturing fluid, a completion fluid, or a work-over fluid. In an embodiment, the thermally activated viscosification compound includes at least one water-soluble hydrophobically modified polymer comprising a hydrophobic substituent having from about 1 to about 22 carbon atoms.

29 Claims, 1 Drawing Sheet

U.S. PATENT DOCUMENTS

| | | | |
|---|---|---|---|
| 4,640,361 | A | 2/1987 | Smith et al. |
| 4,814,096 | A | 3/1989 | Evani |
| 4,997,487 | A | 3/1991 | Vinson et al. |
| 5,104,954 | A | 4/1992 | Mueller |
| 5,135,577 | A | 8/1992 | Brothers |
| 5,192,461 | A | 3/1993 | Tomaszewski et al. |
| 5,432,245 | A | 7/1995 | Roberts et al. |
| 5,558,161 | A | 9/1996 | Vitthal et al. |
| 5,913,364 | A | 6/1999 | Sweatman |
| 5,939,485 | A | 8/1999 | Bromberg et al. |
| 5,945,387 | A | 8/1999 | Chatterji et al. |
| 5,968,879 | A | 10/1999 | Onan et al. |
| 6,059,036 | A | 5/2000 | Chatterji et al. |
| 6,060,434 | A | 5/2000 | Sweatman et al. |
| 6,167,967 | B1 | 1/2001 | Sweatman |
| 6,169,058 | B1 | 1/2001 | Le et al. |
| 6,194,356 | B1 | 2/2001 | Jones et al. |
| 6,258,757 | B1 | 7/2001 | Sweatman et al. |
| 6,422,314 | B1 * | 7/2002 | Todd et al. ................ 166/312 |
| 6,444,316 | B1 | 9/2002 | Reddy et al. |
| 6,527,051 | B1 | 3/2003 | Reddy et al. |
| 6,554,071 | B1 | 4/2003 | Reddy et al. |
| 6,660,694 | B1 | 12/2003 | Taylor et al. |
| 2001/0020531 | A1 * | 9/2001 | Varadaraj et al. ......... 166/270.1 |
| 2005/0075249 | A1 | 4/2005 | Reddy et al. |
| 2005/0178546 | A1 | 8/2005 | Reddy et al. |

FOREIGN PATENT DOCUMENTS

| | | |
|---|---|---|
| WO | 9700275 | 1/1997 |
| WO | 0073623 | 12/2000 |

OTHER PUBLICATIONS

Carlsson, Anders, et al., "Characterization of the Interaction between a Nonionic Polymer and a Cationic Surfactant by the Fourier Transform NMR Self-Diffusion Technique," J. Phy. Chem, 1989, vol. 93, No. 9, pp. 3673-3677.

Carlsson, Anders, et al., "Polymer-Surfactant Interactions. Binding of N-Tetradecylpridinium Bromide to Ethyl (hydroxyethyl) cellulose," American Chemical Society, Langmuir, 1989, vol. 5, No. 5, pp. 1250-1252.

Carlsson, Anders, et al., "Thermal Gelation of Nonionic Cellulose Ethers and Ionic Surfactants in Water," Colloids and Surfaces, 1990, vol. 47, pp. 147-165.

Foreign communication from a related counterpart application—PCT/GB2004/005336, dated Apr. 19, 2005, 12 pgs.

Ide, Nobuhiro, et al., "Thermoreversible Hydrogel of Short-Chain 0-(2,3 Dihydroxypropyl) cellulose/Borax Aqueous Solution, Microscopic versus Macroscopic Properties," Macromolecules, 1998, vol. 31, No. 25, pp. 8878-8885.

Karlstrom, Gunnar, et al., "Phase Diagrams of Nonionic Polymer-Water Systems. Experimental and Theoretical Studies of the Effects of Surfactants and Other Cosolutes," J. Phys. Chem., 1990, vol. 94, No. 12, pp. 5005-5015.

Office Action dated Apr. 19, 2006 (17 pages), U.S. Appl. No. 10/780,314, filed Feb. 17, 2004.

Office Action dated Dec. 19, 2006 (9 pages), U.S. Appl. No. 10/780,314, filed Feb. 17, 2004.

Office Action dated Jul. 26, 2007 (11 pages), U.S. Appl. No. 10/780,314, filed Feb. 17, 2004.

Notice of Allowance dated Nov. 1, 2007 (8 pages), U.S. Appl. No. 10/780,314, filed Feb. 17, 2004.

Office Action dated Sep. 1, 2006 (11 pages), U.S. Appl. No. 10/780,314, filed Feb. 17, 2004.

Peng, Shufu, et al., "$CA^{2+}$-induced Thermoreversible and Controllable Complexation of Poly(N-vinylcaprolactam-co-sodium acrylate) Microgels in Water," J. Phys. Chem B, 2001, vol. 105, No. 12, pp. 2331-2335.

Sarrazin-Cartalas, Anne, et al., "Association and Thermal Gelation in Mixtures of Hydrophobically Modified Polyelectrolytes and Nonionic Surfactants," American Chemical Society, Langmuir, 1994, vol. 10, No. 5, pp. 1421-1426.

Varghese, S., et al., "Designing new thermoreversible gels by molecular tailoring of hydrophilic-hydrophobic interactions," Journal of Chemical Physics, 2000, vol. 112, No. 6, pp. 3063-3070.

Zana, R., et al., "Ethyl(hydroxyethyl)cellulose-Cationic Surfactant Interactions: Electrical Conductivity, Self-Diffusion, and Time-Resolved Fluorescence Quenching Investigations," J. Phys. Chem., 1992, vol. 96, No. 13, pp. 5461-5465.

Foreign Communication from a related counterpart application—European Examination Report, EP 04 806 138.6, Aug. 31, 2007, 9 pages.

Eoff, Larry, et al., "Development of a hydrophobically modified water-soluble polymer as a selective bullhead system for water-production problems," SPE 80206, 2003, pp. 1-9, Society of Petroleum Engineers Inc.

Taylor, K. C., et al., "Water-soluble hydrophobically associating polymers for improved oil recovery: a literature review," SPE 29008, 1995, pp. 675-690, Society of Petroleum Engineers, Inc.

* cited by examiner

WELL BORE SERVICING FLUIDS COMPRISING THERMALLY ACTIVATED VISCOSIFICATION COMPOUNDS AND METHODS OF USING THE SAME

CROSS-REFERENCE TO RELATED APPLICATIONS

This is a Divisional Application of U.S. patent application Ser. No. 10/780,314, filed Feb. 17, 2004 and entitled "Well Bore Servicing Fluids Comprising Thermally Activated Viscosification Compounds and Methods of Using the Same," which is hereby incorporated by reference herein in its entirety.

FIELD OF THE INVENTION

This invention generally relates to well bore servicing fluids and methods of servicing a well bore. More specifically, the invention relates to methods of servicing a well bore using a servicing fluid comprising a thermally activated viscosification compound for promoting the suspension of particles in the servicing fluid.

BACKGROUND OF THE INVENTION

Natural resources such as gas, oil, and water residing in a subterranean formation can be recovered using well-known techniques. The steps taken to prepare for the recovery of such resources usually require the use of various fluids. For example, drilling fluids or muds are typically circulated through well bores as they are drilled into the formation. During the drilling process, the drill bit generates drill cuttings that consist of small pieces of shale and rock. The drilling fluid carries the drill cuttings in a return flow stream back to the well drilling platform. After terminating the circulation of the drilling fluid, a string of pipe, e.g., casing, is run in the well bore. The drilling fluid is then usually circulated downwardly through the interior of the pipe and upwardly through the annulus, which is located between the exterior of the pipe and the walls of the well bore.

Another fluid known as a gravel packing fluid having a relatively large grained sand, i.e., gravel, suspended therein also may be utilized to prevent migration of smaller grained sand from the subterranean formation into the well bore and to maintain the integrity of the formation. In particular, a permeable screen may be placed against the face of the subterranean formation, followed by pumping the gravel packing fluid into the annulus of the well bore such that gravel becomes packed against the exterior of the screen. In addition, a cement slurry may be pumped into the well bore during a primary cementing process in which the cement slurry is placed in the annulus of the well bore and permitted to set into a hard mass (i.e., sheath) to thereby attach the string of pipe to the walls of the well bore and seal the annulus. Subsequent secondary cementing operations, e.g., completion and work over operations, may also be performed using cement slurries.

Yet another fluid, i.e., a fracturing fluid, is typically used to fracture the subterranean formation. The fracturing fluid is pumped into the well bore at a rate and a pressure sufficient to form fractures that extend into the subterranean formation, providing additional pathways through which fluids being produced can flow into the well bores. The fracturing fluid is usually a water-based fluid containing a gelling agent, i.e., a polymeric material that absorbs water and forms a gel as it undergoes hydration. The gelling agent serves to increase the viscosity of the fracturing fluid. The fracturing fluid also typically includes particulate matter known as a proppant, e.g., graded sand, bauxite, or resin coated sand, may be suspended in the fracturing fluid. The proppant becomes deposited into the fractures and thus holds the fractures open after the pressure exerted on the fracturing fluid has been released.

The viscosities of conventional fluids used in a well bore usually decrease with increasing temperatures. As such, the fluids undesirably undergo thermal thinning as they pass down the well bore where they are exposed to increasing temperatures. Viscosification agents such as gelling agents may be added to the fluids to increase their viscosities. However, the resulting fluids are very viscous at the earth's surface and thus require relatively high pump pressures to be conveyed downhole. In addition, they also experience thermal thinning as they pass down the well bore.

Unfortunately, the thermal thinning of fluids as they pass down the well bore typically leads to various problems, depending on the type of fluid involved. For example, the drilling fluid may be unable to suspend drill cuttings therein as it flows back to the surface. Thus, the drill cuttings may settle out of the drilling fluid and become deposited in undesired locations in the well bore. Furthermore, those fluids containing particles such as the cement slurry, the gravel packing fluid, and the fracturing fluid may experience settling of the particles as the fluids are pumped down the well bore. As a result, the particles are not transported to their proper locations in the well bore. Further, in the absence of such particles, the density of the fluids may drop to a level at which they are incapable of withstanding relatively high fluid pressures downhole, particularly in the case of a high density cement slurry. A need therefore exists for maintaining the viscosity of fluids as they are passed into a well bore so as to prevent the settling of materials in those fluids.

SUMMARY OF THE INVENTION

Well bore servicing fluids include a thermally activated viscosification compound. Further, methods of servicing a well bore include displacing such a servicing fluid into the well bore, wherein a viscosity of the servicing fluid increases as it passes down the well bore due to its temperature increasing. Thus, the viscosity of the servicing fluid is effective to suspend solids therein when the servicing fluid is in the well bore. The servicing fluid may be, for example, a cement slurry, a drilling fluid, a gravel packing fluid, a fracturing fluid, a completion fluid, or a work-over fluid. In an embodiment, the thermally activated viscosification compound includes at least one water-soluble hydrophobically modified polymer comprising a hydrophobic substituent having from about 1 to about 22 carbon atoms. The hydrophobically modified polymer may be non-ionic or ionic. When the hydrophobically modified polymer is non-ionic, the servicing fluid may or may not include an ionic surfactant, an inorganic ion, or combinations thereof. When the hydrophobically modified polymer is ionic, the servicing fluid may or may not comprise a non-ionic surfactant, an inorganic ion, or combinations thereof.

DESCRIPTION OF THE DRAWINGS

The invention, together with further advantages thereof, may best be understood by reference to the following description taken in conjunction with the accompanying drawing in which.

DETAILED DESCRIPTION OF THE PREFERRED EMBODIMENTS

Figure 1:
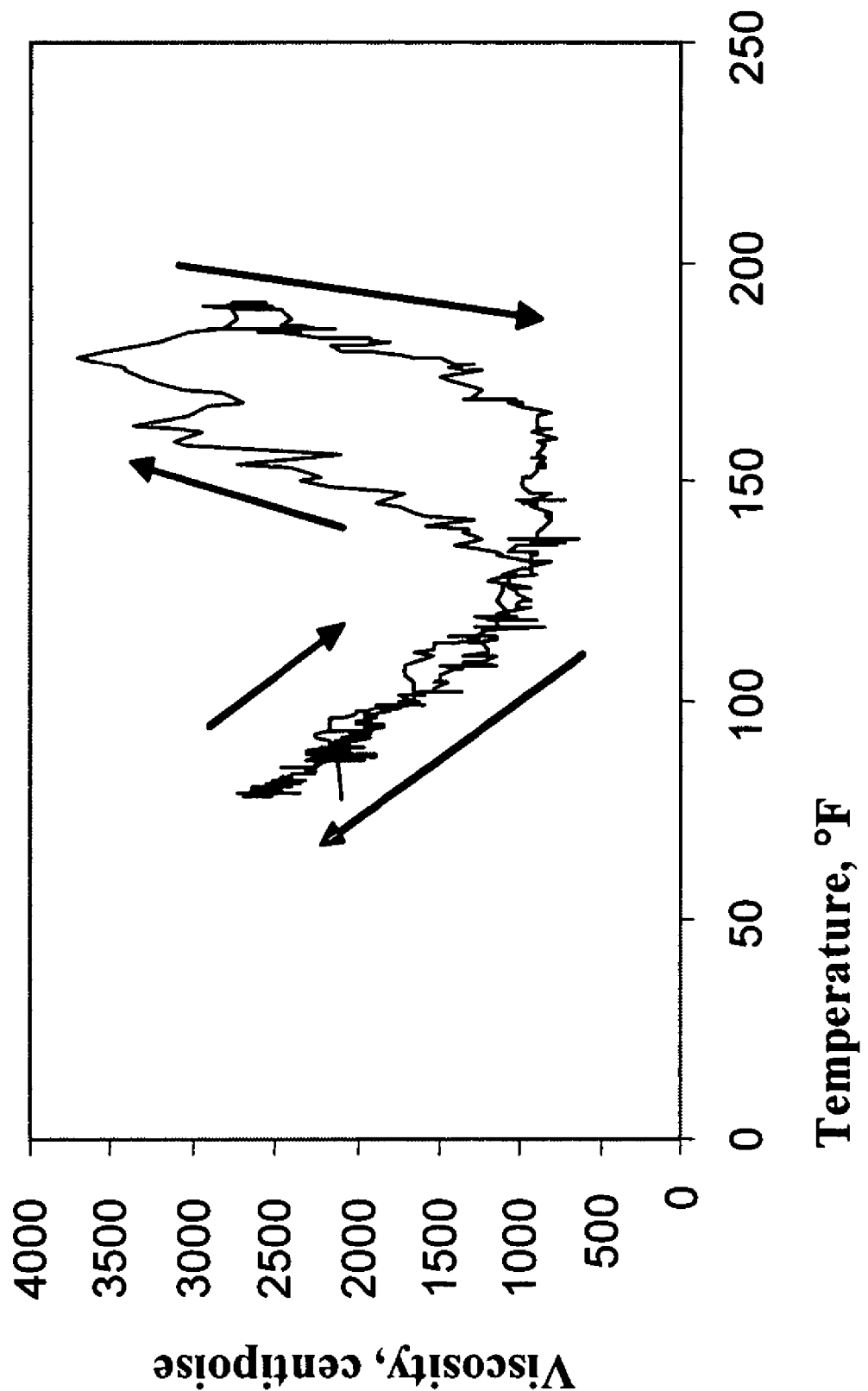
FIG. 1 depicts the viscosity of an aqueous solution containing a thermoreversible acrylic polymer as a function of temperature.

In accordance with an embodiment, servicing fluids for servicing a well bore comprise a thermally activated viscosification compound. As used herein, a "servicing fluid" refers to a fluid used to drill, complete, work over, fracture, or in any way prepare a well bore for the recovery of materials residing in a subterranean formation penetrated by the well bore. It is understood that "subterranean formation" encompasses both areas below exposed earth or areas below earth covered by water such as sea or ocean water. As used herein, a "thermally activated viscosification compound" refers to a compound that causes the viscosity of a fluid in which it is contained to increase as the temperature of the fluid increases and optionally decrease as the temperature of the fluid decreases. As such, the viscosity of the servicing fluid is effective to suspend solids in the fluid as it is being passed down a well bore, particularly a high temperature or geothermal well bore. Further, when the fluid containing the thermally activated viscosification compound is near the surface of the earth, its viscosity is sufficiently low such that the pump pressure required to pump it into the well bore is relatively low.

Examples of servicing fluids include, but are not limited to, a drilling fluid or mud, a cement slurry, a gravel packing fluid, a fracturing fluid, a completion fluid, and a work-over fluid, all of which are well known in the art. The servicing fluid is preferably an aqueous fluid, and it may comprise components other than the thermally activated viscosification compound. As would be apparent to one skilled in the art, these components may vary depending on the intended use of the servicing fluid. The thermally activated viscosification compound and these other components may be combined with the servicing fluid in any order deemed appropriate by one skilled in the art.

The thermally activated viscosification compound may comprise, for example, at least one chemically crosslinked gel-forming compound, at least one physically crosslinked gel-forming compound, or combinations thereof. A chemically crosslinked gel refers to a gel in which an additional, smaller molecule is chemically bonded between at least two crosslinked polymer chains, wherein the gel is usually thermally irreversible, i.e., its formation cannot be reversed by changing its temperature; however, the swelling of the gel by the absorption of aqueous fluids can be reversible with temperature changes. A physically crosslinked gel refers to a gel having a transient bond or complex between at least two non-crosslinked polymer chains without the use of additional, smaller molecules, wherein the gel is usually thermally reversible and the transient bond, which is typically present in polymers containing hydrophobic groups, can be dissociated with changes in shear or temperature. In a preferred embodiment, the thermally activated viscosification compound comprises a linear polymer that is capable of forming a thermally reversible gel, preferably a physically crosslinked gel. The specific concentration of the thermally activated viscosification compound in the servicing fluid depends upon the intended use of the fluid. In an embodiment, the servicing fluid comprises from about 0.1% to about 5% of the thermally activated viscosification compound by total weight of the servicing fluid.

In an embodiment, the thermally activated viscosification compound includes at least one water-soluble hydrophobically modified polymer, wherein the hydrophobic substituent has from about 1 to about 22 carbon atoms. The thermally activated viscosification compound may comprise a non-ionic water-soluble hydrophobically modified polymer, an ionic water-soluble hydrophobically modified polymer, or combinations thereof. When the thermally activated viscosification compound comprises a non-ionic hydrophobically modified polymer, the servicing fluid may or may not comprise an ionic surfactant, an inorganic salt, or combinations thereof, depending on the particular polymer being used. In the case where the thermally activated viscosification compound comprises an ionic hydrophobically modified polymer, the servicing fluid might or might not comprise a non-ionic surfactant, an inorganic salt, or combinations thereof, depending on the particular polymer being used.

Examples of non-ionic water-soluble hydrophobically modified polymers capable of forming gels without ionic surfactants or inorganic salts include alkyl hydroxyl alkylcellulose, methyl cellulose ethers, and hydroxypropyl methyl cellulose ethers, which are used either singly or in combination with one or more starches. Suitable methyl cellulose ethers and hydroxyproyl methyl cellulose ethers are commercially available from Dow Chemical Company under the trade name METHOCEL polymers. Other examples of non-ionic water-soluble hydrophobically modified polymers capable of forming gels without ionic surfactants or inorganic salts include the following: copolymers of N-alkylacrylamides and hydrophilic comonomers as described in U.S. Pat. No. 5,104,954 and in Varghese et al., "Designing New Thermoreversible Gels by Molecular Tailoring of Hydrophilic-Hydrophobic Interactions", 112 *J. Chemical Physics* (USA), p. 3063-3070 (2000), each of which is incorporated by reference herein in its entirety; copolymers of N,N-dimethylacrylamides and alkoxyalkyl or alkyl acrylates as described in U.S. Pat. No. 5,104,954, which is incorporated by reference herein in its entirety; ethyleneoxide-propyleneoxide-ethyleneoxide tri-block polymers commercially available from BASF Corporation of Mount Olive, N.J. under the tradename PLURONICS polymers; and poly(ethyleneglycol-(DL-lactic acid)-ethyleneglycol) triblock copolymers.

Examples of non-ionic water-soluble hydrophobically modified polymers capable of forming gels when used in combination with an ionic surfactant include ethyl hydroxyethyl-, methyl-, hydroxypropyl-, and long alkyl group modified cellulose ethers combined with anionic surfactants such as sodium dodecyl sulfate or cationic surfactants such as cetyltrimethylammonium bromide. A suitable commercially available ethyl hydroxyethyl cellulose ether is BERMOCOLL CST-103 polymer sold by Akzo Nobel Corporation of Switzerland. Examples of non-ionic water-soluble hydrophobically modified polymers capable of forming gels when used in combination with an inorganic metal ion include hydroxypropyl ethers of cellulose combined with borax as described in Ide et al., "Thermoreversible Hydrogel of Short Chain O-(2,3-Dihydroxypropyl)cellulose/Borax Aqueous Solution. Microscopic vs Macroscopic Properties," 31 *Macromolecules*, p. 8878-8885, (1998), which is incorporated by reference herein in its entirety.

Examples of ionic water-soluble hydrophobically modified polymers capable of forming gels without non-ionic surfactants or inorganic salts include: copolymers of N-alkylacrylamides and ionic monomers as described in U.S. Pat. No. 5,432,245, incorporated by reference herein in its entirety; copolymers of stearylacrylate and acrylic acid; terpolymers of N-isopropylacrylamide, trimethyl acrylamidopropyl ammonium iodide, and 3-dimethyl-(methacryloxyethyl) ammonium propane sulfonate; copolymers of N-teriarybutylacrylamide or N-isopropylacrylamide and 2-acrylamide-2-methyl propane sulfonic acid; and poly(ethyleneoxide)-block-poly(propyleneoxide)-block-poly(ethyleneoxide) grafted with polysodium acrylate.

An example of an ionic water-soluble hydrophobically modified polymer capable of forming a gel when used in combination with a nonionic surfactant includes hydrophobically modified poly(sodium acrylate) combined with an oligoethylene glycol monodecyl ether surfactant. An example of an ionic water-soluble hydrophobically modified polymer capable of forming a gel when used in combination with an inorganic metal ion includes a copolymer of N-vinylcaprolactam and sodium acrylate combined with a calcium salt as described in Peng et al., "$Ca^{2+}$ Induced Thermoreversible and Controllable Complexation of Poly(N-vinylcaprolactam-co-sodium acrylate) Microgels in Water," 105 *J. Phys. Chem. B*, p 2331-2335 (2001), which is incorporated by reference herein in its entirety. It is understood that any combinations of the foregoing examples of ionic and non-ionic hydrophobically modified polymers may be used in the well bore servicing fluid.

In an embodiment, the well bore servicing fluid is an aqueous fluid that optionally comprises an encapsulated salt capable of being released downhole for reducing a temperature of the servicing fluid and thereby reducing a viscosity of the servicing fluid. The encapsulated salt can endothermically dissolve in the water of the servicing fluid upon its release. Examples of such salts include ammonium salts such as ammonium chloride and ammonium nitrate, sodium salts such as sodium chloride, sodium nitrite, and sodium nitrate, and potassium salts such as potassium chloride, potassium nitrite, potassium nitrate, and potassium permanganate. An example of a method of encapsulation is described in U.S. Pat. No. 6,554,071, which is incorporated by reference herein in its entirety. Additional details regarding the use of the encapsulated salt in the servicing fluid are described later.

According to another embodiment, methods of using a previously described servicing fluid comprising a thermally activated viscosification compound to service a well bore include displacing the fluid into the well bore so that it may be used for its intended purpose. Due to the presence of the thermally activated viscosification compound, the servicing fluid does not undergo thermal thinning but instead increases in viscosity as it passes down the well bore as a result of its temperature increasing. That is, the thermally activated viscosification compound forms a gel, preferably a thermally reversible gel, as it passes down the well bore. The viscosity of the servicing fluid is effective to suspend solids therein when the servicing fluid is in the well bore where it is subjected to relatively high temperatures. Thus, there is no need to be concerned that solids contained in the servicing fluid, e.g., cement particles in a cement slurry, sand or gravel particles in a gravel packing fluid, or proppant in a fracturing fluid, will settle before the fluid has been used to perform its intended purpose. In addition, the viscosity of the servicing fluid at a temperature near the surface of the earth (e.g., about room temperature) is low enough to require relatively low pump pressures for conveyance downhole.

In an embodiment, the servicing fluid is used as an aqueous fracturing fluid that contains at least one encapsulated salt and at least one thermally activated viscosification compound capable of forming a physically crosslinked, thermally reversible gel, wherein examples of suitable encapsulated salts and thermally activated viscosification compounds are provided above. The servicing fluid may be pumped into the well bore at a pressure sufficient to fracture the subterranean formation. As the servicing fluid passes down the well bore, the salt remains encapsulated such that it does not contact the fluid. In the manner described above, the viscosity of the fluid increases as it passes downhole, ensuring that the fluid is viscous enough to fracture the subterranean formation and to carry a proppant to the formation. Then the encapsulated salt is strategically released after the fracturing has occurred and the proppant has been deposited in the subterranean formation. The release of the salt may result from the absorption of water by the coating surrounding the encapsulated salt, which causes the coating to swell. The water of the servicing fluid is thus allowed to enter the interior of the encapsulated salt where it endothermically dissolves the salt and becomes released into the well bore. Due to the endothermic dissolution of the salt, the temperature of the servicing fluid decreases. As a result of this temperature decrease, the viscosity of the servicing fluid decreases, allowing the fluid to be more efficiently flowed back to the surface of the earth with less formation damage.

In another embodiment, the servicing fluid is used as a drilling fluid that contains a thermally activated viscosification compound capable of forming a physically crosslinked, thermally reversible gel. In this case, a well bore is drilled while circulating the servicing fluid into the well bore and back to the surface, resulting in the formation of drill cuttings. The servicing fluid in the well bore is relatively hot and viscous and thus has a viscosity effective to suspend and carry the drill cuttings back to the surface. The drilling fluid can be collected in tanks near the surface to allow the fluid to cool such that its viscosity drops, resulting in the settling of the drill cuttings. Those drill cuttings then can be separated from the drilling fluid using conventional techniques such as subjecting the mixture to vibrations with shale shakers, centrifugation, or dilution with water. This method provides for prolonged maintenance of the properties of the drilling fluid without having to replenish its components such that the fluid can be reused multiple times.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

An aqueous solution containing 2% thermoreversible acrylic polymer by weight of the solution was placed in a 50 mL graduated cylinder. The cylinder containing the polymer solution was then placed in a mineral oil heating bath. A No. 3 spindle was attached to a BROOKFIELD viscometer (model DV-II+) manufactured by Brookfield Engineering Lab Inc. of Middleboro, Mass., and the spindle was immersed in the polymer solution. The mineral oil was heated a few degrees at a time while measuring the viscosity of the polymer solution. After reaching the maximum temperature, the temperature was decreased at a rate of a few degrees per minutes. Table 1 below shows the average viscosity of the polymer solution for each temperature interval. In addition, FIG. 1 depicts the viscosity of the polymer solution as a function of temperature.

TABLE 1

| Temperature Range, °F. | Average Viscosity, centipoise |
|---|---|
| 77-96 | 2,260 |
| 97-100 | 1,750 |
| 101-118 | 1,300 |

TABLE 1-continued

| Temperature Range, °F. | Average Viscosity, centipoise |
|---|---|
| 119-165 | 900 |
| 166-180 | 1,400 |
| 181-160 | 2,900 |
| 161-130 | 1,500 |
| 131-108 | 1,150 |
| 107-77 | 2,500 |

As shown in Table 1 and in FIG. 1, the polymer solution initially behaved as a typical polymer in water that experiences thermal thinning in response to an increase in temperature. In particular, the viscosity of the polymer solution decreased as it was heated from 77° F. to 165° F. Then, surprisingly, as the polymer solution was heated from 166° F. to 180° F., its viscosity began to rise. Then its viscosity rose even more as it was cooled from 181° F. to 160° F. Subsequent cooling of the polymer solution caused its viscosity to drop and then to rise again. These results show that the thermoreversible acrylic polymer forms a reversible gel upon heating and can serve as a thermally activated viscosification compound in a well bore servicing fluid.

Example 2

The polymer solution in Example 1 was diluted such that the amount of the thermoreversible acrylic polymer present in the solution was 1% by weight of the solution. Moreover, sodium chloride in an amount of 1% by weight of the polymer solution was added to the solution. The viscosity of the resulting polymer solution was measured as described in Example 1. The results are shown in Table 2 below.

TABLE 2

| Temperature Range, °F. | Average Viscosity, Centipoise |
|---|---|
| 78-99 | 128 |
| 100-118 | 210 |
| 119-170 | 85 |
| 169-100 | 43 |
| 99-84 | 380 |
| 84-77 | 250 |

The results in Table 2 suggest that the thermoreversible acrylic polymer and an ionic compound can be used in combination to form a solution that viscosifies reversibly with temperature in certain temperature ranges. Thus, the polymer can serve as a thermally activated viscosification compound in a well bore servicing fluid. The results also show that the viscosification temperature range may or may not be identical during heating and cooling cycles or vice versa.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore, comprising: placing a servicing fluid comprising a thermally activated viscosification compound and an encapsulated salt into the wellbore, wherein a viscosity of the servicing fluid increases as it passes down the well bore due to its temperature increasing, and wherein the encapsulated salt is selected from the group consisting of ammonium nitrate, sodium chloride, sodium nitrite, potassium chloride, potassium nitrite, potassium nitrate, potassium permanganate and combinations thereof, and wherein the thermally activated viscosification compound comprises a hydrophobically modified ionic polymer and an oligoethylene glycol monodecyl ether surfactant.

2. The method of claim 1, wherein the ionic hydrophobically modified polymer is selected from the group consisting of copolymers of N-alkylacrylamides and ionic monomers, copolymers of stearylacrylate and acrylic acid, terpolymers of N-isopropylacrylamide, trimethyl acrylamidopropyl ammonium iodide, and 3-dimethyl-(methacryloxyethyl)ammonium propane sulfonate, copolymers of N-tertiarybutylacrylamide or N-isopropylacrylamide and 2-acrylamide-2-methyl propane sulfonic acid, poly(ethyleneoxide)-block-poly(propyleneoxide)-block-poly(ethyleneoxide) grafted with poly(sodium acrylate); hydrophobically modified poly(sodium acrylate), and combinations thereof.

3. The method of claim 1, wherein an amount of the thermally activated viscosification compound present in the servicing fluid ranges from about 0.1% to about 5% by total weight of the servicing fluid.

4. The method of claim 1, further comprising swelling the encapsulated salt to release the salt into the servicing fluid.

5. The method of claim 1, wherein the servicing fluid is selected from the group consisting of cement slurry, a gravel packing mud, a fracturing fluid, a completion fluid, a work over fluid and combinations thereof.

6. The method of claim 1, wherein the viscosity of the servicing fluid is effective to suspend drill cuttings therein as the servicing fluid flows back to the surface of the earth.

7. The method of claim 1, further comprising allowing the viscosity of the servicing fluid to decrease at the surface due to its temperature decreasing, thereby causing the drill cuttings to settle.

8. The method of claim 1, wherein a viscosity of the servicing fluid is effective to suspend solids therein when the servicing fluid is in the well bore.

9. The method of claim 1, further comprising flowing the servicing fluid back to the surface of the earth.

10. The method of claim 1, wherein the wellbore servicing fluid further comprises a starch.

11. The method of claim 1, wherein the ionic hydrophobically modified polymer comprises copolymers of stearylacrylate and acrylic acid.

12. The method of claim 1, wherein the ionic hydrophobically modified polymer comprises copolymers of N-tertiarybutylacrylamide or N-isopropylacrylamide and 2-acrylamide-2-methyl propane sulfonic acid.

13. The method of claim 1, wherein the ionic hydrophobically modified polymer comprises terpolymers of N-isopropylacrylamide, trimethyl acrylamidopropyl ammonium iodide, and 3-dimethyl-(methacryloxyethyl)ammonium propane sulfonate.

14. The method of claim 1, wherein the wellbore servicing fluid is an aqueous fluid.

15. A method of servicing a well bore penetrating a subterranean formation, comprising:
   placing a servicing fluid comprising a thermally activated viscosification compound, an encapsulated salt, and a proppant into the well bore, wherein a viscosity of the servicing fluid increases as it passes down the well bore;
   fracturing the subterranean formation; and
   depositing the proppant in the subterranean formation, wherein the viscosity of the servicing fluid is reduced by release of the encapsulated salt into the servicing fluid, wherein the thermally activated viscosification compound comprises a hydrophobically modified ionic polymer and an oligoethylene glycol monodecyl ether surfactant.

16. The method of claim 15, wherein the encapsulated salt is selected from the group consisting of ammonium nitrate, sodium chloride, sodium nitrite, potassium chloride, potassium nitrite, potassium nitrate, potassium permanganate and combinations thereof.

17. The method of claim 16, wherein the ionic hydrophobically modified polymer comprises copolymers of stearylacrylate and acrylic acid.

18. The method of claim 16, wherein the ionic hydrophobically modified polymer comprises copolymers of N-tertiarybutylacrylamide or N-isopropylacrylamide and 2-acrylamide-2-methyl propane sulfonic acid.

19. The method of claim 16, wherein the ionic hydrophobically modified polymer comprises terpolymers of N-isopropylacrylamide, trimethyl acrylamidopropyl ammonium iodide, and 3-dimethyl-(methacryloxyethyl)ammonium propane sulfonate.

20. The method of claim 15, further comprising swelling the encapsulated salt to release the salt into the servicing fluid.

21. The method of claim 15, wherein an amount of the thermally activated viscosification compound present in the servicing fluid ranges from about 0.1% to about 5% by total weight of the servicing fluid.

22. The method of claim 15, wherein the wellbore servicing fluid is an aqueous fluid.

23. The method of claim 15, wherein the ionic hydrophobically modified polymer comprises copolymers of stearylacrylate and acrylic acid.

24. The method of claim 15, wherein the ionic hydrophobically modified polymer comprises copolymers of N-tertiarybutylacrylamide or N-isopropylacrylamide and 2-acrylamide-2-methyl propane sulfonic acid.

25. The method of claim 15, wherein the ionic hydrophobically modified polymer comprises terpolymers of N-isopropylacrylamide, trimethyl acrylamidopropyl ammonium iodide, and 3-dimethyl-(methacryloxyethyl)ammonium propane sulfonate.

26. The method of claim 15, further comprising flowing the servicing fluid back to the surface of the earth.

27. The method of claim 15, wherein the ionic hydrophobically modified polymer comprises copolymers of stearylacrylate and acrylic acid;
   wherein the encapsulated salt is selected from the group consisting of ammonium nitrate, sodium chloride, sodium nitrite, potassium chloride, potassium nitrite, potassium nitrate, potassium permanganate and combinations thereof; and
   wherein an amount of the thermally activated viscosification compound present in the servicing fluid ranges from about 0.1% to about 5% by total weight of the servicing fluid.

28. The method of claim 15, wherein the ionic hydrophobically modified polymer comprises copolymers of N-tertiarybutylacrylamide or N-isopropylacrylamide and 2-acrylamide-2-methyl propane sulfonic acid;
   wherein the encapsulated salt is selected from the group consisting of ammonium nitrate, sodium chloride, sodium nitrite, potassium chloride, potassium nitrite, potassium nitrate, potassium permanganate and combinations thereof; and
   wherein an amount of the thermally activated viscosification compound present in the servicing fluid ranges from about 0.1% to about 5% by total weight of the servicing fluid.

29. The method of claim 15, wherein the ionic hydrophobically modified polymer comprises terpolymers of N-isopropylacrylamide, trimethyl acrylamidopropyl ammonium iodide, and 3-dimethyl-(methacryloxyethyl)ammonium propane sulfonated;
   wherein the encapsulated salt is selected from the group consisting of ammonium nitrate, sodium chloride, sodium nitrite, potassium chloride, potassium nitrite, potassium nitrate, potassium permanganate and combinations thereof; and
   wherein an amount of the thermally activated viscosification compound present in the servicing fluid ranges from about 0.1% to about 5% by total weight of the servicing fluid.

* * * * *